United States Patent
Allen et al.

(10) Patent No.: US 8,375,389 B2
(45) Date of Patent: Feb. 12, 2013

(54) ORDERED SCHEDULING OF SUSPENDED PROCESSES BASED ON RESUMPTION EVENTS

(75) Inventors: Nicholas A. Allen, Redmond, WA (US); John A. Taylor, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 295 days.

(21) Appl. No.: 12/908,797

(22) Filed: Oct. 20, 2010

(65) Prior Publication Data

US 2012/0102493 A1    Apr. 26, 2012

(51) Int. Cl.
*G06F 9/46* (2006.01)
(52) U.S. Cl. ......... 718/100; 718/102; 718/103; 718/107
(58) Field of Classification Search ................... 718/100, 718/102, 103, 104, 107
See application file for complete search history.

(56) References Cited

U.S. PATENT DOCUMENTS

| | | | |
|---|---|---|---|
| 5,530,802 A | 6/1996 | Fuchs et al. | |
| 6,065,009 A | 5/2000 | Leymann et al. | |
| 6,105,148 A | 8/2000 | Chung et al. | |
| 6,269,391 B1* | 7/2001 | Gillespie | 718/100 |
| 6,567,840 B1* | 5/2003 | Binns et al. | 718/103 |
| 6,584,436 B2* | 6/2003 | Hellestrand et al. | 703/13 |
| 6,748,451 B2* | 6/2004 | Woods et al. | 709/248 |
| 6,751,583 B1* | 6/2004 | Clarke et al. | 703/17 |
| 6,873,987 B1 | 3/2005 | Novaes et al. | |
| 7,165,252 B1* | 1/2007 | Xu | 718/102 |
| 7,444,638 B1* | 10/2008 | Xu | 718/104 |
| 7,716,668 B2* | 5/2010 | Moore et al. | 718/104 |
| 7,853,743 B2* | 12/2010 | Todoroki et al. | 710/260 |
| 8,219,997 B2* | 7/2012 | Shimizu et al. | 718/104 |
| 2002/0152105 A1 | 10/2002 | Dan et al. | |
| 2003/0225644 A1 | 12/2003 | Casati et al. | |
| 2005/0015766 A1* | 1/2005 | Nash et al. | 718/102 |
| 2009/0281818 A1 | 11/2009 | Li et al. | |
| 2010/0180106 A1 | 7/2010 | Grinshpun et al. | |
| 2010/0185682 A1 | 7/2010 | Grinshpun et al. | |

OTHER PUBLICATIONS

Riteau, et al., "Handling Persistent States in Process Checkpoint/Restart Mechanisms for HPC Systems", Retrieved at << http://inria.ccsd.cnrs.fr/docs/00/34/67/45/PDF/RR-6765.pdf >>, Dec. 2008, pp. 19.

Chappell, David, "Workflows, Services, and Models", Retrieved at << http://msdn.microsoft.com/en-us/library/dd200919.aspx >>, Oct. 2008, pp. 18.

Wang, et al., "Checkpointing and Its Applications", Retrieved at << http://ieeexplore.ieee.org/stamp/stamp.jsp?tp=&arnumber=466999 >>, Proceedings of the Twenty-Fifth International Symposium on Fault-Tolerant Computing, Jun. 27-30, 1995, pp. 22-31.

* cited by examiner

*Primary Examiner* — Van Nguyen
(74) *Attorney, Agent, or Firm* — Toler Law Group, PC

(57) ABSTRACT

A method includes receiving a plurality of resumption events associated with a plurality of suspended processes. Each resumption event is associated with a suspended process. Each resumption event also includes an execution time and a resumption time window. The method includes determining resumption deadlines for the suspended processes and determining a resumption order based on the resumption deadlines. The resumption deadline for a suspended process is based on the execution time and the resumption time window of the corresponding resumption event. The suspended processes are scheduled for execution in accordance with the resumption order.

20 Claims, 6 Drawing Sheets

FIG. 2

Resumption queue (e.g., data table of database, events stored in event arrival order) — 210

| DESIRED EXECUTION TIME | RESUMPTION TIME WINDOW | LOCK | LOCK EXPIRATION TIME | INSTANCE ID |
|---|---|---|---|---|
| 11:58:00 PM | 60 SECONDS | TRUE | 12:00:00 AM | GUID0 — 211 |
| 12:01:00 AM | 120 SECONDS | FALSE | NULL | GUID1 — 212 |
| 12:00:00 AM | 30 SECONDS | FALSE | NULL | GUID2 — 213 |
| 12:02:00 AM | 30 SECONDS | FALSE | NULL | GUID3 — 214 |
| 12:03:00 AM | 30 SECONDS | FALSE | NULL | GUID4 — 215 |
| ... | ... | ... | ... | ... — 225 |

221 — 222 — 223 — 224

LOCKED RESUMPTION EVENT (SUSPENDED PROCESS ALREADY SCHEDULED FOR EXECUTION)

EVENT DATABASE (E.G., STORED AT ONE OR MORE DATA STORAGE DEVICES)

200

ORDERED SCHEDULING OF SUSPENDED PROCESSES BASED ON RESUMPTION EVENTS

BACKGROUND

Multitasking is common in enterprise computing systems. For example, a task may be executed, paused (e.g., to allow execution of some other task), and resumed one or more times before the task is completed. When multiple tasks can be executed, paused, or suspended at any point in time, the order in which tasks are resumed may impact efficiency of the enterprise computing system.

SUMMARY

Computer applications and processes that are executing at a computing system may be suspended involuntarily or voluntarily. For example, an involuntary suspension of a process may occur when the process or the computing device executing the processes crashes. Conversely, voluntary suspensions may be beneficial in certain situations. For example, a long-running process (e.g., a workflow application) may benefit from persisting state and voluntarily entering a suspended mode. A long-running process may suspend upon reaching a certain execution state, such as waiting for data, waiting for user input, or sleeping for a predetermined time period. Suspending the long-running process may free up computing resources to be allocated to execute some other previously suspended process.

In an enterprise setting, process resumption may be implemented as an event-driven system and may be controlled by a resumption processor. When an event occurs that can trigger resumption of a suspended process, the event may be stored in a resumption queue. In resource-constrained environments, there may be more resumption events to be serviced (i.e., suspended processes to be resumed) than there are resources available. Simply executing the resumption events in the order they are queued may not be efficient and may not comply with enterprise policies. For example, crash recovery events may be more urgent than timeout events, and enterprise policy may dictate that certain crash recovery events should be serviced before timeout events even if the crash recovery events were received later. However, a bright line rule that always prioritizes crash recovery events at the expense of timeout events may be undesirable. For example, in the event of multiple simultaneous crashes, the delay in processing a timeout event due to the high number of crash recovery events may be unacceptably high.

Systems and methods of performing ordered resumption scheduling of suspended processes based on resumption events are disclosed. Resumption events may be prioritized, scheduled, or re-scheduled on a per-event basis, thereby providing more granular control, increased throughput, and decreased latency in resuming suspended processes. Resumption events may be stored in a resumption queue, where each event is associated with a suspended process, includes a desired execution time, and includes a resumption time window. Resumption deadlines may be determined for the events in the resumption queue based on the desired execution times and the resumption time windows, and a resumption order may be determined based on the resumption deadlines. The suspended processes may be scheduled for execution based on the resumption order.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 2 is a diagram to illustrate contents of a particular embodiment of the resumption queue of FIG. 1;

DETAILED DESCRIPTION

In a particular embodiment, a method includes receiving a plurality of resumption events associated with a plurality of suspended processes. Each resumption event is associated with a suspended process, and each resumption event includes an execution time and a resumption time window. The method also includes determining resumption deadlines for the suspended processes. The resumption deadline for a suspended process is based on the execution time and the resumption time window of the resumption event associated with the suspended process. The method further includes determining a resumption order based on the resumption deadlines and scheduling the suspended processes for execution in accordance with the resumption order.

In another particular embodiment, a computer system includes an interface configured to receive resumption events from one or more event sources. Each resumption event is associated with a suspended process, includes an execution time, and includes a resumption time window. The computer system also includes a processor and a data storage device storing a resumption queue. The computer system further includes a memory coupled to the processor, the memory storing instructions executable by the processor to cause execution of a resumption module. The resumption module is configured to store the received events in the resumption queue and to determine resumption deadlines for the suspended processes based on the execution times and the resumption time windows of the resumption events. The resumption module is also configured to determine the resumption order based on the resumption deadlines and to schedule the suspended processes for execution at one or more computing devices based on the resumption order.

In another particular embodiment, a non-transitory computer-readable storage medium includes instructions that, when executed by a computer, cause the computer to receive a plurality of resumption events associated with a plurality of suspended processes. Each resumption event is associated with a suspended process, includes an execution time, and includes a resumption time window. The instructions are also executable to store the resumption events at a resumption queue and to determine a resumption deadline for each suspended process. The resumption deadline for each suspended process is determined by computing a sum of the execution time and the resumption time window of the resumption event associated with the suspended process. The instructions are further executable to determine a resumption order by sorting the resumption deadlines and to schedule each of the suspended processes for execution in accordance with the resumption order.

Figure 1:
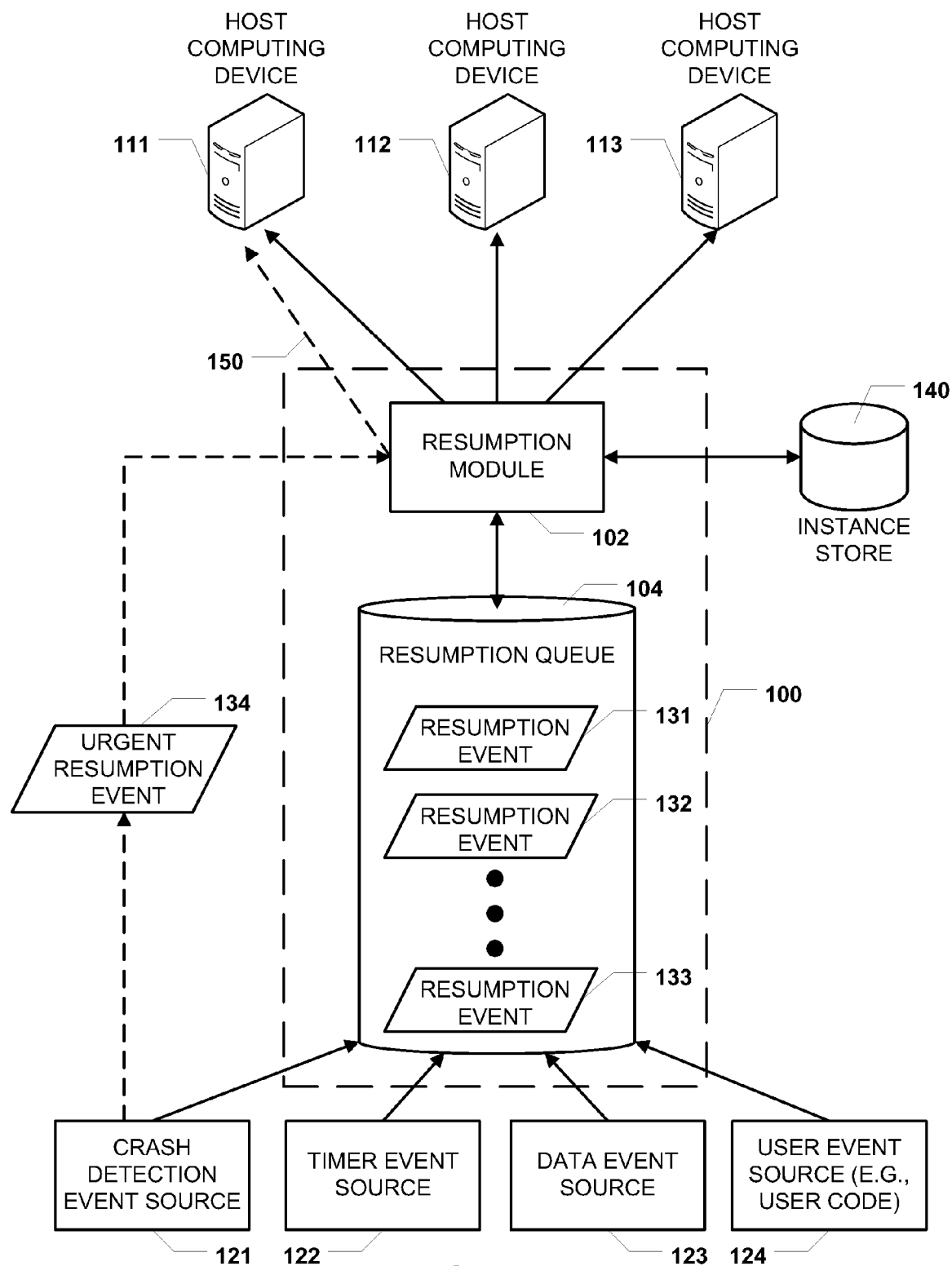
FIG. 1 is a diagram to illustrate a particular embodiment of a system to perform ordered scheduling of suspended processes based on resumption events.

FIG. 1 is a diagram to illustrate a particular embodiment of a system 100 to perform ordered scheduling of suspended processes based on resumption events. The system 100 includes a resumption module 102 and a resumption queue 104. The system 100 may be communicatively coupled to one or more event sources (e.g., illustrative crash detection event source 121, timer event source 122, data event source 123, and user event source 124). The system 100 may also be communicatively coupled to one or more host computing devices (e.g., illustrative host computing devices 111, 112, and 113). Generally, the system 100 may be operable to schedule resumption events at the host computing devices 111-113 in a prioritized order. The system 100 may enable per-event (i.e., per-suspended process) scheduling decisions.

In a particular embodiment, the system 100 includes one or more interfaces (e.g., network interfaces) that are configured to communicate with the event sources 121-124 and with the host computing devices 111-113 via one or more networks (e.g., a local area network (LAN), a wide area network (WAN), or the Internet). The system 100 may receive resumption events (e.g., illustrative resumption events 131, 132, and 133) from the event sources 121-124 via the interface(s).

Each resumption event 131-133 may be associated with a suspended process. The suspended process may be a long-running computing process that was executing at one of the host computing devices 111-113 prior to being suspended. In a particular embodiment, the suspended process may be associated with a suspended process instance that is stored at an instance store 140. The suspended process instance may include information that enables the suspended process to be resumed. For example, the suspended process instance may include application data of the long-running computing process, an execution context of the long running computing process, or any combination thereof.

One or more of the resumption events 131-133 may include one or more crash detection events from the crash detection event source 121. For example, if the first host computing device 111 crashes while a particular process is executing, a crash detection event may be generated by the crash detection event source 121, where the crash detection event is associated with the (now suspended) particular process. One or more of the resumption events 131-133 may also include one or more timer events from the timer event source 122. For example, a process executing at the host computing device 111 may suspend itself (e.g., "sleep") for a particular period of time (e.g., 24 hours). When the time period has elapsed, the timer event source 122 may generate a timer event associated with the suspended process. Servicing the timer event may "wake" the suspended process. One or more of the resumption events 131-133 may further include one or more data events or user events. For example, a data event may be generated by the data event source 123 when data is available for a process that was suspended while waiting for the data. To illustrate, a long-running stock trading process may become suspended at the close of business while waiting for new stock prices to arrive the following morning. User events may be programmatically generated by user code or user applications.

Each resumption event 131-133 may include an execution time (e.g., a "desired" time that indicates when an associated suspended process should preferably be resumed) and a resumption time window (e.g., a grace period during which the associated suspended process may be resumed without being rescheduled). Factors that influence the value of the execution time and resumption time window may include, but are not limited to, characteristics of the suspended process and suspended process instance, characteristics of the event source that generated the event, and characteristics of the particular host computing device where the suspended process was previously executed before being suspended.

The resumption module 102 may be configured to store the resumption events 131-133 in the resumption queue 104. The resumption events 131-133 may be stored in the resumption queue 104 in an arrival order (i.e., the order in which they arrived at the system 100). The resumption module 102 may also be configured to determine resumption deadlines for the suspended processes associated with the resumption events 131-133. For a particular suspended process associated with a particular resumption event, the resumption deadline may be equal to a sum of the execution time and the resumption time window of the particular resumption event. For example, if a suspended process "P" is associated with a resumption event "E" that includes an execution time of "9:00 AM" and a resumption time window of "10 minutes," then the resumption deadline of "P" may be "9:10 AM."

The resumption module 102 may determine a resumption order based on the resumption deadlines. It should be noted that the resumption order may be different than the arrival order. For example, the resumption order may represent a prioritized order in which the resumption events 131-133 and their associated suspended processes are scheduled for execution. In a particular embodiment, determining the resumption order includes sorting the resumption events by resumption deadline (e.g., in chronological order). For example, if the resumption deadline for the suspended process "P" is "9:10 AM," and the resumption deadline for another suspended process "Q" is "9:15 AM," then the suspended process "P" may be scheduled for execution before the suspended process "Q" is scheduled for execution.

In a particular embodiment, the resumption module 102 selectively queues less than all received resumption events from the event sources 121-124. For example, the resumption module 102 may be configured to schedule suspended processes for execution during a plurality of scheduling periods (e.g., every 5 minutes). Occasionally, an urgent resumption event 134 associated with an urgent suspended process may be received. The execution time prior of the urgent resumption event 134 may be prior to a next scheduling period (e.g., the execution time may occur within the next 5 minutes). In response, the resumption module 102 may schedule the urgent suspended process for execution without storing the urgent resumption event 134 in the resumption queue 104, as illustrated at 150.

In a particular embodiment, the resumption queue 104 includes one or more data tables of a relational database. The relational database may be stored at one or more data storage devices of the system 100, one or more data storage devices external to the system 100, or any combination thereof. Thus, although FIG. 1 depicts a "queue," the resumption queue 104 may be implemented as a random access data structure, a first-in-first-out (FIFO) data structure, or some other data structure. When the resumption queue 104 is implemented as a data table, the resumption deadlines and resumption order may be determined via execution of one or more relational database queries (e.g., structured query language (SQL) queries). For example, each row of the data table may represent a resumption event. Executing the query may generate a computed column representing the resumption deadlines, and the output of the query may be ordered by the resumption deadlines. Resumption events and determining a resumption order are further described with reference to FIGS. 2-3.

The resumption module 102 may schedule suspended processes for execution at the host computing devices 111-113 based on the resumption order. For example, the suspended processes may be scheduled one-at-a-time, in batches for one or more of the host computing devices 111-113, or any combination thereof. When a suspended process is resumed by a host computing device 111-113, the associated resumption event may be removed from the resumption queue 104. A suspended process may be considered as "successfully" resumed when a host computing device 111-113 loads a suspended process instance and/or transmits a confirmation to the resumption module 102. Scheduling the suspended process for execution may include allocating resources for the suspended process at an assigned host computing device 111-113. Scheduling the suspended process for execution may also include retrieving the associated suspended process instance from the instance store 140 and transmitting the retrieved suspended process instance to the assigned host computing device 111-113. Alternately, the assigned host computing device 111-113 may retrieve the appropriate instance from the instance store 140 (e.g., based on a globally unique identifier (GUID) of the suspended process that is included in the resumption event).

In other embodiments, the resumption event associated with the suspended process may include a lock and an expiration time for the lock. Scheduling the suspended process for execution may also include setting the lock to indicate that the suspended process has been scheduled at the assigned host computing device. If the resumption module 102 determines that the lock expiration time has elapsed while the resumption event is still in the resumption queue 104, the resumption module 102 may reschedule the suspended process at another host computing device 111-113. For example, rescheduling a suspended process from a first host computing device 111 to a second host computing device 112 may include deallocating resources at the first host computing device 111, resetting the lock to indicate that the suspended process is no longer scheduled at the first host computing device 111, allocating resources at the second host computing device 112, scheduling the suspended process for execution at the second host computing device 112, and setting the lock to indicate that the suspended process is scheduled at the second host computing device 112.

In an alternate embodiment, the resumption module 102 elevates the priority of the resumption event (and by extension, the suspended process) instead of rescheduling the suspended process. Elevating the priority of the resumption event in the resumption queue 104 may result in the suspended process being scheduled for execution based on the elevated priority. In one embodiment, elevating the priority of the resumption event leads to the resumption event being treated as an urgent resumption event (e.g., similar to the urgent resumption event 134) for faster service.

The host computing devices 111-113 may be servers, desktop computers, laptop computers, workstations, or other computing devices. In a particular embodiment, the identity and order of task execution at the host computing devices 111-113 is centrally controlled by the resumption module 102. For example, to schedule a suspended process for execution at the third host computing device 113, the resumption module 102 may transmit a resumption event for the suspended process to the third host computing device 113. The third host computing device 113 may retrieve an appropriate instance from the instance store 140 and may execute the suspended process in accordance with the desired execution time that is specified in the resumption event. In a particular embodiment, the host computing devices 111-113 are configured to cause generation of events by the event sources 121-124. For example, a process at the third host computing device 113 may be programmed to "sleep for at least one hour." The third host computing device 113 may store an instance for a process and may suspend the process. The host computing device 113 may also transmit a message to the timer event source 122 that causes the timer event source 122 to generate a timer event having an execution time one hour in the future. The timer event may be received by the resumption module 102 and may be scheduled as described above, resulting in resumption of the sleeping process.

It should be noted that although the resumption events 131-133 may be provided to the host computing devices 111-113 prior to desired execution times on the basis of resumption deadlines, the host computing devices 111-113 may nonetheless attempt to resume suspended processes as close as possible to the desired execution times. By providing resumption events to host computing devices 111-113 in advance in accordance with a prioritized order that is determined by resumption deadlines, the resumption module 102 may decrease an overall latency of the system 100.

Operation at the system 100 is described with reference to a particular example of a banking application. While a banking application is described by way of example, the system 100 is applicable to a variety of applications, such as workflow applications, data processing applications, enterprise applications, and applications that include long-running processes. The banking application may include three processes—an account update process that adds/deletes/modifies accounts, a heartbeat process that verifies an overall health of the banking application every five minutes, and a logging process that moves transaction logs from temporary buffers to permanent storage (e.g., hard disks). Initially, each of the processes may be in a suspended state.

The resumption module 102 may receive and store the resumption events 131-133 at the resumption queue 104. For example, the first resumption event 131 may be a data event associated with the account update process, indicating that an account is to be updated (e.g., to replace an old customer address with a new customer address). The first resumption event 131 may include an execution time of "1:00 PM" and a resumption time window of "600 seconds." The second resumption event 132 may be a timer event associated with the heartbeat process. For example, the second resumption event 132 may include an execution time of "1:00 PM" and a resumption time window of "120 seconds." The third resumption event 133 may be a crash detection event associated with the logging process. The third resumption event may include an execution time of "1:01 PM" and a resumption time window of "240 seconds."

The resumption module 102 may determine resumption deadlines for the resumption events 131-133 and may determine a resumption order based on the resumption deadlines. For example, the resumption deadlines for the resumption events 131-133 may be "1:10 PM," "1:02 PM," and "1:05 PM," respectively. The resumption order may identify the second resumption event 132, followed by the third resumption event 133, followed by the resumption event 131. The resumption module 102 may schedule the suspended processes for execution based on the resumption order. For example, based on the resumption order, the heartbeat process may be scheduled for execution, followed by the logging process, followed by the account update process. When a suspended process is successfully resumed, the resumption module 102 may remove the corresponding resumption event 131-133 from the resumption queue. If a suspended process is not successfully resumed, the resumption module 102 may reschedule the suspended process at a different host computing device 111-113 and/or elevate a priority of the suspended process by elevating a priority of the corresponding resumption event 131-133 in the resumption queue 104.

It will be appreciated that the system 100 of FIG. 1 may enable per-event and per-process prioritization of suspended processes. Thus, software developers and system administrators may tailor desired execution times and resumption time windows of individual events to increase throughput and decrease latency at the system 100. For example, the system 100 may be integrated into a workflow application platform or into an application server (e.g., a cloud-accessible or network-accessible application server). The system 100 may prioritize resumption events in accordance with different service level agreements (SLAs) for different customers. For example, suspended processes of customers that pay higher fees or that have lower promised latencies in their SLA may be prioritized over other suspended processes.

FIG. 2 is a diagram to illustrate a particular embodiment of a resumption queue 210 that is stored at an event database 200. In an illustrative embodiment, the resumption queue 210 may be within or may be the resumption queue 104 of FIG. 1.

In the particular embodiment illustrated in FIG. 2, the resumption queue 210 is implemented as a data table of the event database 200 and stores resumption events in arrival order. For example, the resumption queue 210 includes a first resumption event 211, a second resumption event 212, a third resumption event 213, a fourth resumption event 214, and a fifth resumption event 215. The row for each resumption event 211-215 includes a desired execution time field 221, a resumption time window field 222, a lock field 223, a lock expiration time field 224, and an instance identifier (ID) field 225 (e.g., an identifier that uniquely identifies a suspended process instance that is to be resumed when the resumption event is serviced).

The first resumption event 211 is associated with a suspended process instance that has an instance ID of "GUID0," includes a desired execution time of "11:58:00 PM," and includes a resumption time window of "60 seconds." The second resumption event 212 is associated with a suspended process instance that has an instance ID of "GUID1," includes a desired execution time of "12:01:00 AM," and includes a resumption time window of "120 seconds." The third resumption event 213 is associated with a suspended process instance that has an instance ID of "GUID2," includes a desired execution time of "12:00:00 AM," and includes a resumption time window of "30 seconds." The fourth resumption event 214 is associated with a suspended process instance that has an instance ID of "GUID3," includes a desired execution time of "12:02:00 AM," and includes a resumption time window of "30 seconds." The fifth resumption event 214 is associated with a suspended process instance that has an instance ID of "GUID4," includes a desired execution time of "12:03:00 AM," and includes a resumption time window of "30 seconds."

As illustrated in FIG. 2, the first resumption event 211 is locked, indicating that the suspended process associated with the suspended process instance having the instance ID of "GUID0" has already been scheduled for execution. The remaining resumption events 212-215 are not locked, indicating that the remaining resumption events 212-215 are not scheduled for execution.

Figure 3:
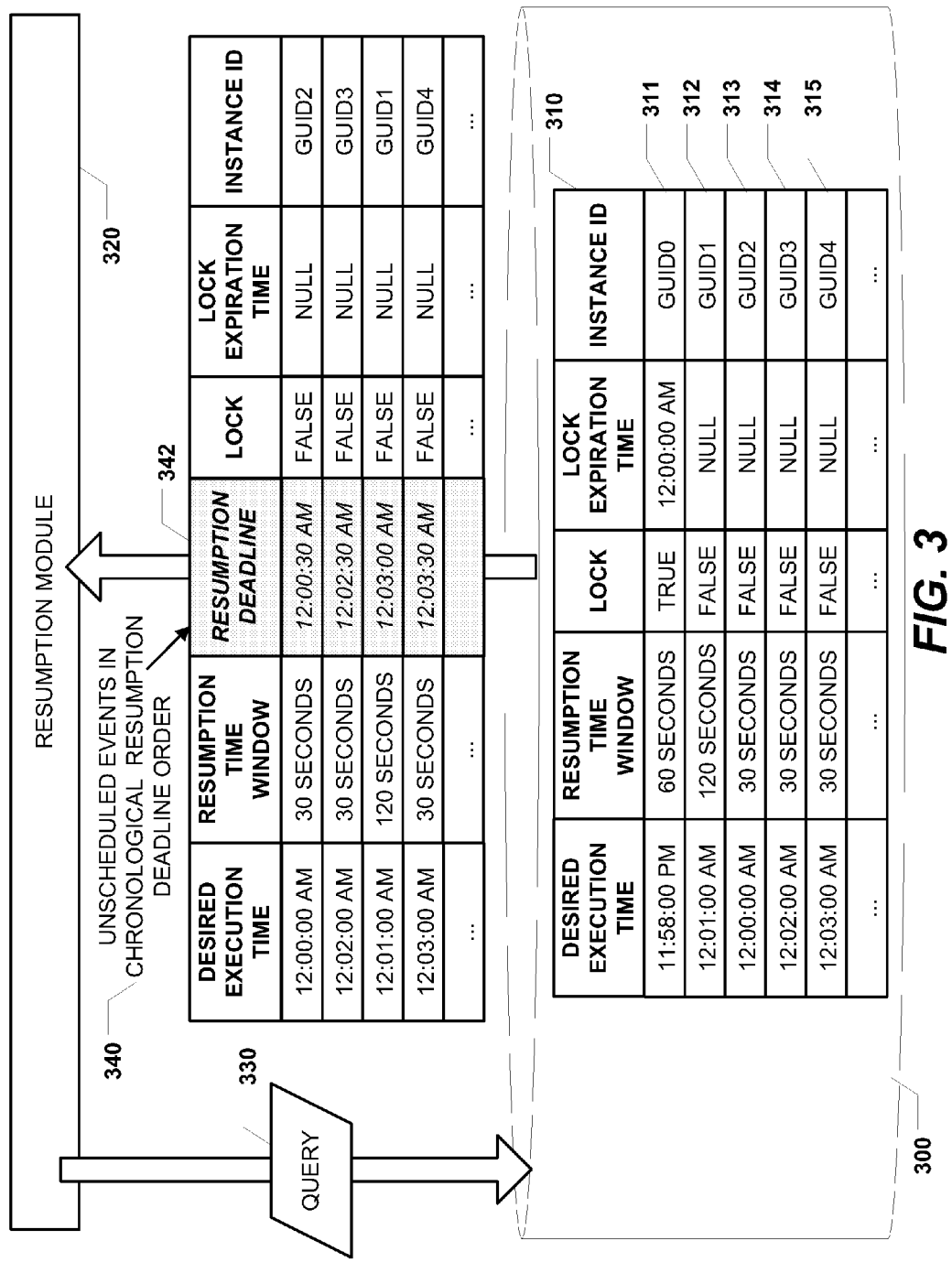
FIG. 3 is a diagram to illustrate a particular embodiment of determining an order in which to schedule resumption of suspended processes.

Storing resumption events in a data table of a database, as illustrated in FIG. 2, may facilitate rapid determination of a resumption order. FIG. 3 is a diagram to illustrate a particular embodiment of determining a resumption order. For example, in the particular embodiment illustrated in FIG. 3, a resumption module 320 may determine a resumption order of suspended processes associated with resumption events 311-315. The resumption events 311-315 may be stored at a resumption queue 310 of an event database 300. In an illustrative embodiment, the resumption module 320 is the resumption module 102 of FIG. 1, the resumption events 311-315 are the resumption events 211-215 of FIG. 2, the event database 300 is the event database 200 of FIG. 2, and the resumption queue 310 is the resumption queue 210 of FIG. 2.

Determining a resumption order for the resumption events 311-315 may include "pushing" a database query 330 onto the resumption queue 310. In alternate embodiments, multiple database queries may be executed. When executed, the database query 330 may produce as output 340 the events 312-315 (but the not the event 311, which is locked) in the resumption order. The resumption order may be a sorted chronological order of the unlocked resumption events 312-315. The resumption deadlines may be represented as a computed column 342 of the output. The resumption module 320 may schedule suspended processes associated with the resumption events 312-315 based on the resumption order, where the resumption order is based on the resumption deadlines that are represented by the computed column 342. For example, as illustrated in FIG. 3, the resumption module 320 may schedule the suspended processes for execution in the following order: GUID2, GUID3, GUID1, GUID 4. In one embodiment, if there is a tie between two resumption deadlines, the tie may be broken by selecting the resumption event having the earlier desired execution time. Alternately, other tiebreaking methods may be chosen.

It will be appreciated that resumption deadlines and a resumption order may be determined by executing the database query 330 without physically rearranging the resumption events 311-315 in the event database 300, thereby conserving time and computing resources.

Figure 4:
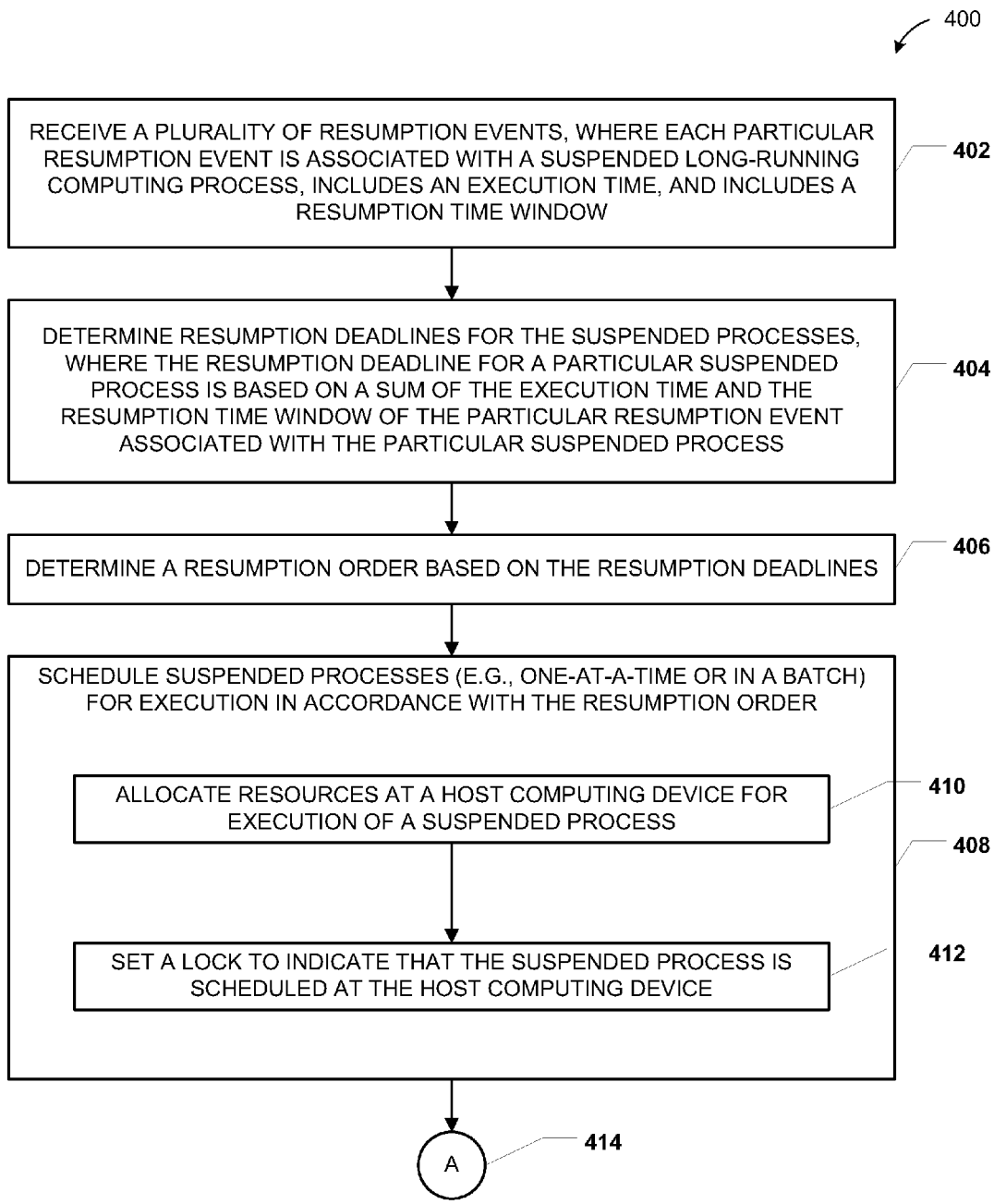
FIG. 4 is a flow diagram to illustrate a particular embodiment of a method of performing ordered scheduling of suspended processes based on resumption events.

FIG. 4 is a flow diagram to illustrate a particular embodiment of a method 400 of performing ordered scheduling of suspended processes based on resumption events. In an illustrative embodiment, the method 400 may be performed at the system 100 of FIG. 1 and may be illustrated with reference to FIGS. 2-3.

The method 400 may include receiving a plurality of resumption events, at 402. Each resumption event may be associated with a suspended long-running computing process, and may include an execution time and a resumption time window. For example, in FIG. 1, the resumption module 102 may receive the resumption events 131-133. In an illustrative embodiment, the resumption events include an execution time and a resumption time window as described with reference to the desired execution time field 221 and the resumption time window field 222 of FIG. 2. For example, the resumption events 131-133 of FIG. 1 may be represented in the tabular format illustrated in FIG. 2, where each of the resumption events 131-133 includes a value for the desired execution time field 221 and for the resumption time window field 222.

The method 400 may also include determining resumption deadlines for the suspended processes, at 404. The resumption deadline for a particular suspended process may be based on a sum of the execution time and the resumption time window of the particular resumption event associated with the particular suspended process. For example, in FIG. 1, the resumption module 102 may determine resumption deadlines for the resumption events 131-133. As another example, referring to FIG. 3, the resumption module 320 may generate the computed column 342 of resumption deadlines via execution of the query 330.

The method 400 may further include determining a resumption order based on the resumption deadlines, at 406. For example, in FIG. 1, the resumption module 102 may determine a resumption order for the resumption events 131-133. As another example, referring to FIG. 3, the resumption order may be represented by the chronological ordering of resumption deadlines, as depicted by the query output 340.

The method 400 may include scheduling suspended processes for execution in accordance with the resumption order, at 408. The suspended processes may be scheduled one-at-a-time, in batches, or a combination thereof. Scheduling a suspended process for execution may include allocating resources at a host computing device, at 410, and setting a lock to indicate that the suspended process is scheduled at the host computing device, at 412. Scheduling the suspended process may also include transmitting the resumption event (or a copy thereof) to the host computing device. For example, in FIG. 1, the resumption module 102 may schedule the second resumption event 132, including allocating resources at the third host computing device 113 and setting a lock of the second resumption event 132. As another example, referring to FIG. 2, the lock field 223 of a resumption event 211-215 may be set to "TRUE." The method 400 may then proceed to A 414, and continue as illustrated in FIG. 5.

Figure 5:
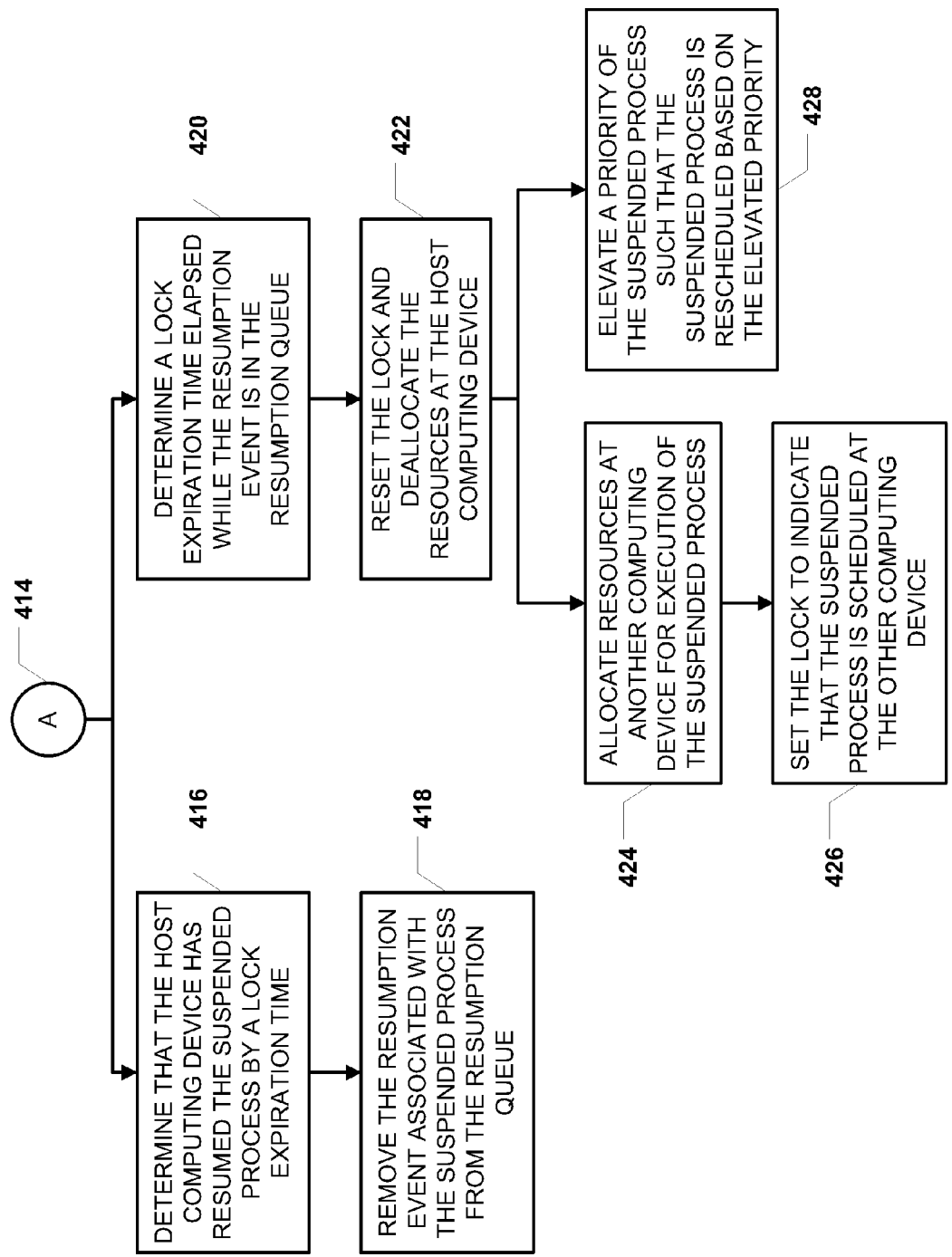
FIG. 5 is a flow diagram to illustrate a continuation of the particular embodiment of the method illustrated in FIG. 4.

Referring to FIG. 5, the method 400 may include determining that the host computing device has resumed the suspended process by a lock expiration time, at 416. Determining that the host computing device has resumed the suspended process by the lock expiration time may represent a "successful" resumption of the suspended process. For example, in FIG. 1, the resumption module 102 may determine that the third host computing device 113 has resumed the suspended process by the expiration time of the lock. In an illustrative embodiment, the lock expiration time is represented as described with reference to the lock expiration time field 224 of FIG. 2. The method 400 may include removing the resumption event associated with the suspended process from the resumption queue, at 418. For example, in FIG. 1, the second resumption event 132 may be removed from the resumption queue 104.

Alternately, the method 400 may include determining that a lock expiration time elapsed while the resumption event is in the resumption queue, at 420. Determining that the lock expired while the resumption event remained stored in the resumption queue may represent an "unsuccessful" resumption of the suspended process. The method 400 may include resetting the lock and deallocating the resources at the host computing device, at 422. For example, in FIG. 1, the resumption module 102 may deallocate the resources at the third host computing device 113 and may reset the lock of the second resumption event 132. Alternatively, the resumption module 102 may reset the lock of the second resumption event 132 without deallocating the resources at the third host computing device 113, relying on an independent cleanup mechanism to determine that the resources are no longer needed and to free the resources.

The method 400 may further include rescheduling the suspended process at another computing device, at 424-426, or elevating a priority of the suspended process, at 428. Rescheduling the suspended process at another computing device may include allocating resources at the other computing device, at 424, and setting the lock to indicate that the process is scheduled at the other computing device, at 426. For example, in FIG. 1, the resumption module 102 may allocate resources at the first host computing device 111 and may set the lock of the resumption event 132. Alternately, the method 400 may include elevating the priority of the suspended process such that the suspended process is rescheduled based on an elevated priority. For example, in FIG. 1, the resumption module 102 may elevate the priority of the second resumption event 132, thereby elevating the priority of the suspended process. In an illustrative embodiment, referring to FIG. 2, elevating the priority of a resumption event may include modifying a priority field (not shown), modifying a value of the desired execution time field 221, modifying a value of the resumption time window field 222, or any combination thereof.

It will be appreciated that the method 400 of FIGS. 4-5 may enable per-event and per-process prioritization, ordering, and scheduling of suspended processes. It will further be appreciated that the method 400 of FIGS. 4-5 may reschedule and reprioritize suspended processes that are not successfully resumed.

Figure 6:
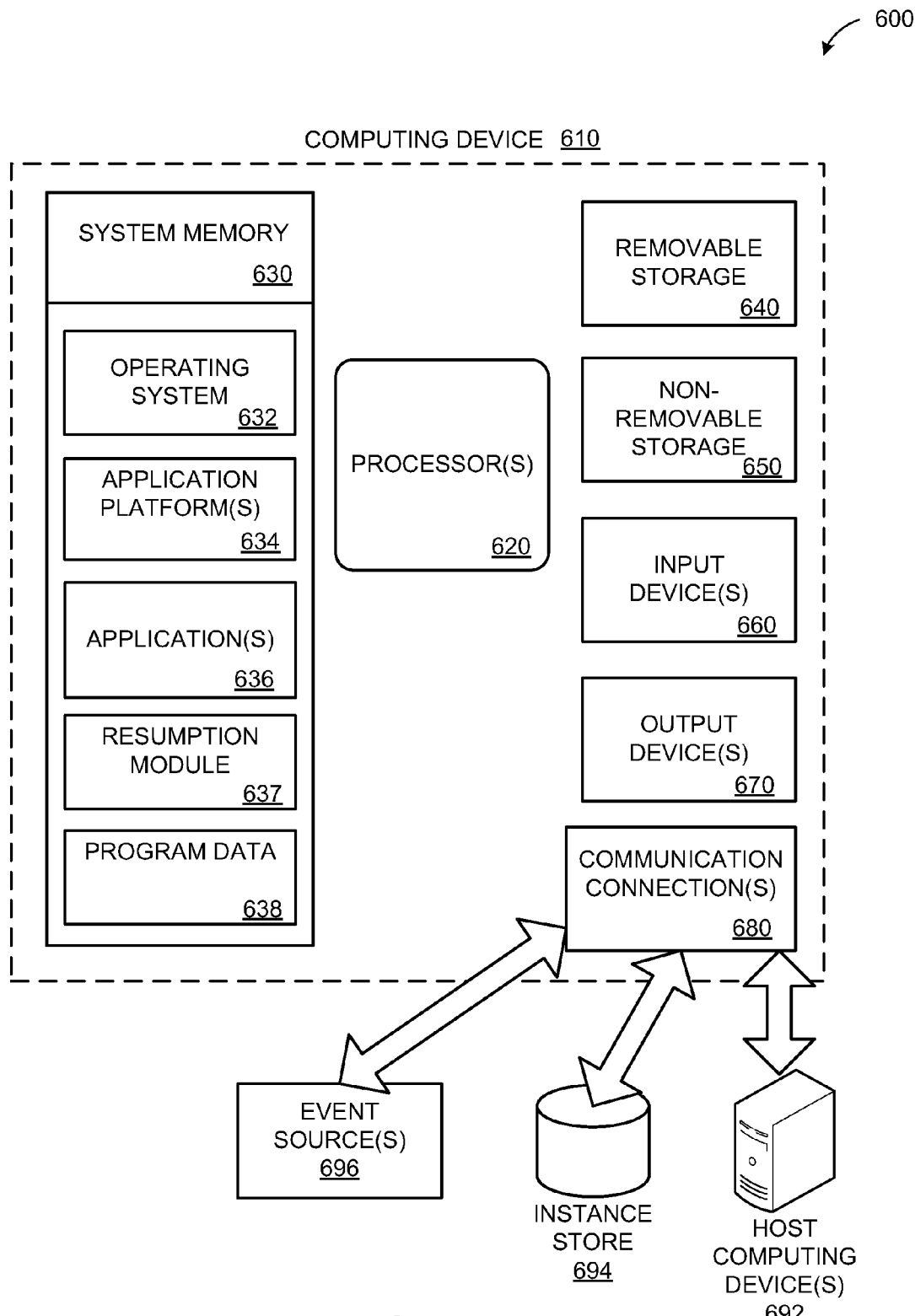
FIG. 6 is a block diagram of a computing environment including a computing device operable to support embodiments of computer-implemented methods, computer program products, and system components as illustrated in FIGS. 1-5.

FIG. 6 shows a block diagram of a computing environment 600 including a computing device 610 operable to support embodiments of computer-implemented methods, computer program products, and system components according to the present disclosure. For example, the computing device 610 or components thereof may include, implement, or be included as a component of the resumption module 102 of FIG. 1, the resumption queue 104 of FIG. 1, the event sources 121-124 of FIG. 1, the instance store 140 of FIG. 1, the host computing devices 111-113 of FIG. 1, the event database 200 of FIG. 2, the resumption module 320 of FIG. 3, the event database 300 of FIG. 3, or portions thereof.

The computing device 610 includes at least one processor 620 and a system memory 630. For example, the computing device 610 may be a desktop computer, a laptop computer, a tablet computer, a mobile phone, a server, or any other fixed or mobile computing device. Depending on the configuration and type of computing device, the system memory 630 may be volatile (such as random access memory or "RAM"), non-volatile (such as read-only memory or "ROM," flash memory, and similar memory devices that maintain stored data even when power is not provided), non-transitory, some combination of the three, or some other memory. The system memory 630 may include an operating system 632, one or more application platforms 634, one or more applications 636, and program data 638. In the embodiment illustrated, the system memory 630 includes a resumption module 637. In an illustrative embodiment, the resumption module 637 may be the resumption module 102 of FIG. 1 or the resumption module 320 of FIG. 3. In another illustrative embodiment, the program data 638 may include all or a portion of the resumption queue 104 of FIG. 1, the resumption queue 210 of FIG. 2, or the resumption queue 310 of FIG. 3.

The computing device 610 may also have additional features or functionality. For example, the computing device 610 may also include removable and/or non-removable additional data storage devices such as magnetic disks, optical disks, tape, and standard-sized or flash memory cards. Such additional storage is illustrated in FIG. 6 by removable storage 640 and non-removable storage 650. Computer storage media may include volatile and/or non-volatile storage and removable and/or non-removable media implemented in any technology for storage of information such as computer-readable instructions, data structures, program components or other data. The system memory 630, the removable storage 640, and the non-removable storage 650 are all examples of computer storage media. The computer storage media includes, but is not limited to, RAM, ROM, electrically erasable programmable read-only memory (EEPROM), flash memory or other memory technology, compact disks (CD), digital versatile disks (DVD) or other optical storage, magnetic cassettes, magnetic tape, magnetic disk storage or other magnetic storage devices, or any other medium that can be used to store information and that can be accessed by the computing device 610. Any such computer storage media may be part of the computing device 610.

The computing device 610 may also have input device(s) 660, such as a keyboard, mouse, pen, voice input device, touch input device, etc. connected via one or more input interfaces. Output device(s) 670, such as a display, speakers, printer, etc. may also be included and connected via one or more output interfaces. The computing device 610 also contains one or more communication connections 680 that allow the computing device 610 to communicate with other computing devices over a wired or a wireless network. In the embodiment illustrated, the computing device 610 may communicate with one or more host computing devices 692, an instance store 694, and one or more event sources 696. In an illustrative embodiment, the one or more host computing devices 692 include the host computing devices 111-113 of FIG. 1, the instance store 694 is the instance store 140 of FIG. 1, and the one or more event sources 696 include the event sources 121-124 of FIG. 1.

It will be appreciated that not all of the components or devices illustrated in FIG. 6 or otherwise described in the previous paragraphs are necessary to support embodiments as herein described. For example, the removable storage 640 may be optional.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Those of skill would further appreciate that the various illustrative logical blocks, configurations, modules, and process steps or instructions described in connection with the embodiments disclosed herein may be implemented as electronic hardware or computer software. Various illustrative components, blocks, configurations, modules, or steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method described in connection with the embodiments disclosed herein may be embodied directly in hardware, in a software module executed by a processor, or in a combination of the two. A software module may reside in computer readable media, such as random access memory (RAM), flash memory, read only memory (ROM), registers, a hard disk, a removable disk, a CD-ROM, or any other form of storage medium known in the art. An exemplary storage medium is coupled to a processor such that the processor can read information from, and write information to, the storage medium. In the alternative, the storage medium may be integral to the processor or the processor and the storage medium may reside as discrete components in a computing device or computer system.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The previous description of the embodiments is provided to enable a person skilled in the art to make or use the embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A computer-implemented method, comprising:
receiving a plurality of resumption events associated with a plurality of suspended processes, wherein each particular resumption event is associated with a particular suspended process, wherein each particular resumption event includes an execution time, and wherein each particular resumption event includes a resumption time window;
determining resumption deadlines for the suspended processes, wherein the resumption deadline for a particular suspended process is based on the execution time and the resumption time window of the particular resumption event associated with the particular suspended process;
determining a resumption order based on the resumption deadlines; and
scheduling the suspended processes for execution in accordance with the resumption order.

2. The computer-implemented method of claim 1, wherein at least one suspended process comprises a long-running computing process.

3. The computer-implemented method of claim 2, wherein the at least one suspended process is associated with a suspended process instance that includes application data of the long-running computing process, an execution context of the long-running computing process, or any combination thereof.

4. The computer-implemented method of claim 1, wherein the plurality of resumption events includes a timer event, a crash detection event, a data event, a user event, or any combination thereof.

5. The computer-implemented method of claim 1, wherein determining the resumption deadline for the particular suspended process comprises computing a sum of the execution time and the resumption time window of the particular resumption event.

6. The computer-implemented method of claim 1, wherein determining the resumption order comprises sorting the resumption deadlines in chronological order.

7. The computer-implemented method of claim 1, further comprising storing the resumption events in a resumption queue.

8. The computer-implemented method of claim 7, wherein the resumption queue comprises a data table of a relational database that is stored at one or more data storage devices.

9. The computer-implemented method of claim 8, wherein determining the resumption deadlines and determining the resumption order comprises executing one or more relational database queries on the data table.

10. The computer-implemented method of claim 7, further comprising removing a resumption event from the resumption queue after the suspended process associated with the resumption event is resumed.

11. The computer-implemented method of claim 10, wherein the suspended process is scheduled for execution and further comprising allocating resources at a host computing device for execution of the suspended process.

12. The computer-implemented method of claim 11, wherein the resumption event associated with the suspended process further includes a lock and wherein scheduling the suspended process for execution further comprises setting the lock to indicate that the suspended process is scheduled at the host computing device.

13. The computer-implemented method of claim 12, wherein the resumption event associated with the suspended process further includes a lock expiration time.

14. The method of claim 13, further comprising:
determining that the lock expiration time elapsed while the resumption event is in the resumption queue;
resetting the lock to indicate that the suspended process is no longer scheduled at the host computing device;
allocating resources at another computing device for execution of the suspended process;
scheduling the suspended process for execution at the other computing device; and
setting the lock to indicate that the suspended process is scheduled at the other computing device.

15. The method of claim 13, further comprising:
determining that the lock expiration time elapsed while the resumption event is in the resumption queue;
resetting the lock to indicate that the suspended process is no longer scheduled at the host computing device; and
elevating a priority of the suspended process such that the suspended process is rescheduled for execution based on the elevated priority.

16. A computer system, comprising:
an interface configured to receive resumption events from one or more event sources, wherein each particular resumption event is associated with a suspended process, wherein each particular resumption event includes an execution time, and wherein each particular resumption event includes a resumption time window;
a processor;
a data storage device storing a resumption queue; and
a memory coupled to the processor, the memory storing instructions executable by the processor to cause execution of a resumption module configured to:
store the received resumption events in the resumption queue;
determine resumption deadlines for the suspended processes based on the execution times and the resumption time windows of the resumption events;
determine a resumption order based on the resumption deadlines; and
schedule the suspended processes for execution at one or more computing devices based on the resumption order.

17. The computer system of claim 16, wherein the resumption module is further configured to:
schedule the suspended processes for execution during a plurality of scheduling periods;
determine that a particular resumption event associated with a particular suspended process has an execution time prior to a next scheduling period; and
schedule the particular suspended process for execution without storing the particular resumption event in the resumption queue.

18. The computer system of claim 16, wherein the resumption module is further configured to schedule a batch of suspended processes for execution at a single computing device.

19. A non-transitory computer-readable storage medium comprising instructions that, when executed by a computer, cause the computer to:
receive a plurality of resumption events associated with a plurality of suspended processes, wherein each particular resumption event is associated with a particular suspended process, wherein each particular resumption event includes an execution time, and wherein each particular resumption event includes a resumption time window;
store the resumption events at a resumption queue;
determine a resumption deadline for each particular suspended process by computing a sum of the execution time and the resumption time window of the particular resumption event associated with the particular suspended process;
determine a resumption order by sorting the resumption deadlines; and
schedule each of the suspended processes for execution in accordance with the resumption order.

20. The non-transitory computer-readable storage medium of claim 19, wherein the resumption events are received and stored at the resumption queue in an arrival order and wherein the resumption order is different than the arrival order.

* * * * *